US012613033B2

(12) United States Patent　　(10) Patent No.:　US 12,613,033 B2

Gleim et al.　　(45) Date of Patent:　Apr. 28, 2026

(54) METHOD FOR OPERATING A GAS BURNER AND GAS BURNER FOR PERFORMING THE METHOD

(71) Applicant: Viessmann Climate Solutions SE, Allendorf (DE)

(72) Inventors: Eugen Gleim, Goßfelden (DE); Marco Link, Marburg (DE)

(73) Assignee: Viessmann Climate Solutions SE, Allendorf (DE)

( * ) Notice: Subject to any disclaimer, the term of this patent is extended or adjusted under 35 U.S.C. 154(b) by 778 days.

(21) Appl. No.: 17/915,352

(22) PCT Filed: Mar. 22, 2021

(86) PCT No.: PCT/EP2021/057284

§ 371 (c)(1),
(2) Date: Sep. 28, 2022

(87) PCT Pub. No.: WO2021/197900

PCT Pub. Date: Oct. 7, 2021

(65) Prior Publication Data

US 2023/0144467 A1　　May 11, 2023

(30) Foreign Application Priority Data

Mar. 30, 2020　(DE) ..................... 10 2020 204 089.3

(51) Int. Cl.
*F23N 5/24*　　(2006.01)
*F23N 1/00*　　(2006.01)
(Continued)

(52) U.S. Cl.
CPC ............. *F23N 5/242* (2013.01); *F23N 1/002* (2013.01); *F23N 5/006* (2013.01); *G01N 27/409* (2013.01);
(Continued)

(58) Field of Classification Search
CPC .......... F23N 5/242; F23N 1/002; F23N 5/006; F23N 2227/18; F23N 2227/20;
(Continued)

(56) References Cited

U.S. PATENT DOCUMENTS 5,462,439 A　*　10/1995　Keith ........................ B60L 1/12
439/246

FOREIGN PATENT DOCUMENTS

DE　　102008043124 A1　　4/2010
DE　　102012213601 A1　　2/2014
(Continued)

OTHER PUBLICATIONS

German Office Action, dated Jan. 11, 2021, for German Patent Application No. 10 2020 204 089.3 (8 pages) (with English translation).
(Continued)

*Primary Examiner* — Allen R. B. Schult
*Assistant Examiner* — William C Weinert
(74) *Attorney, Agent, or Firm* — Seed Intellectual Property Law Group LLP

(57)　　ABSTRACT

A gas burner comprises an automatic firing unit for regulating or controlling an amount of gas supplied to the gas burner via a gas control valve and a lambda probe (1) arranged in the exhaust gas flow for measuring a residual oxygen content in the exhaust gas. A method for operating the gas burner comprises a first operating state in which the gas burner is operated in standard mode, wherein the residual oxygen content in the exhaust gas is regulated via the measured value of the lambda probe (1). According to the invention, in a second operating state, the gas burner performs a fault test on the lambda probe (1) involving the steps of: deactivating (S18) a supply of power to a pump cell (PZ) of the lambda probe (1); determining a present test
(Continued)

voltage (h) of a measurement cell (NZ) of the lambda probe (1); comparing (S25) the present test voltage (h) with a predefined test setpoint voltage (i) and determining a difference; and if the difference exceeds a predefined limit value, performing a safety deactivation (S29); or if the difference does not exceed the predefined limit value, operating the gas burner in the first operating state.

10 Claims, 3 Drawing Sheets

(51) Int. Cl.
    *F23N 5/00*            (2006.01)
    *G01N 27/409*     (2006.01)
    *G01N 27/417*     (2006.01)
(52) U.S. Cl.
    CPC ...... *G01N 27/4175* (2013.01); *F23N 2227/18* (2020.01); *F23N 2227/20* (2020.01)
(58) Field of Classification Search
    CPC ........ F23N 2225/30; F23N 5/24; F23N 5/265; G01N 27/409; G01N 27/4175
    USPC .......................................................... 431/76
    See application file for complete search history.

(56)           References Cited

FOREIGN PATENT DOCUMENTS

| DE | 102013105466 B3 | * | 10/2014 | ............. F23N 5/006 |
|----|-----------------|---|---------|--------------------------|
| DE | 102015215521 A1 | * | 3/2016 | ......... G01N 27/4175 |
| DE | 102018211599 A1 | | 1/2020 | |
| EP | 3064937 A1 | | 9/2016 | |
| FR | 2975499 A1 | * | 11/2012 | ............. G01R 31/52 |
| WO | WO-02070954 A1 | * | 9/2002 | ............. F23N 5/265 |
| WO | WO 2014043717 A1 | | 3/2014 | |

OTHER PUBLICATIONS

International Search Report, mailed Jun. 30, 2021, for International Patent Application No. PCT/EP2021/057284. (5 pages) (with English translation).

* cited by examiner

METHOD FOR OPERATING A GAS BURNER AND GAS BURNER FOR PERFORMING THE METHOD

The present invention relates to a method for operating a gas burner and a gas burner, in particular a gas burner for a heating system. The gas burner includes a lambda probe arranged in the exhaust gas flow.

European patent application EP 3 064 937 A1 discloses a generic method directed at detecting errors in the lambda probe and thus preventing a dangerous operating state, for example of a gas burner.

Lambda sensors are used to measure the air ratio of an exhaust gas stream from a combustion process. The air ratio quantifies the residual oxygen content in the exhaust gas flow. Depending on the air ratio measured, the combustion process may be controlled such that a desired residual oxygen content in the exhaust gas is achieved.

The air ratio is also referred to as the combustion air ratio A and is a dimensionless variable that is calculated as the ratio of the air mass actually available to the minimum air mass required. A=1 is called the stoichiometric combustion air ratio, at which all fuel molecules can react completely with the oxygen in the air without any oxygen required for combustion missing or unburned fuel remaining. At $\lambda > 1$ there is an "excess of air" which is also referred to as a lean mixture. At $\lambda < 1$, there is an "shortage of air", which is also referred to as a rich mixture.

The operational principle of a broadband lambda sensor is generally known and is only briefly summarized with reference to FIG. 1. FIG. 1 shows a schematic sectional view of a broadband lambda probe 1 including a pump cell PZ, a measuring chamber MK (or measuring space or measuring gap) and a measuring cell NZ (or reference cell or Nernst cell). The pump cell PZ is positioned adjacent to an exhaust flow. The measuring chamber MK is located adjacent to the pump cell PZ. The measuring cell NZ for measuring a measuring voltage is arranged next to the measuring chamber MK. Accordingly, the lambda probe 1 is formed in a layered structure of pump cell PZ, measuring chamber MK and measuring cell NZ, The pump cell PZ and the measuring cell NZ each have electrodes 3 which are separated by a solid electrolyte, for example zirconium dioxide. In particular, the lambda probe 1 includes a pump cell PZ with a diffusion channel 4 and a controller VSR. The pump cell PZ is supplied with a pump current by a power supply so that the pump cell PZ pumps oxygen from the exhaust gas into the measuring chamber MK or out of the measuring chamber MK.

The pump cell and the measuring cell are brought to an operating temperature of, for example, about 800° C. by means of a heater 2. At this temperature, the solid electrolyte of the pump cell PZ and the measuring cell NZ is permeable to oxygen ions.

The oxygen content of the measuring gas in the measuring chamber MK is influenced, on the one hand, by the exhaust gas entering the measuring chamber MK through the diffusion channel 4 and, on the other hand, by the pump current IP. Depending on the polarity, the pump current IP pumps oxygen from the exhaust gas through the solid electrolyte into the measuring chamber MK or from the measuring chamber MK to the exhaust gas.

The pump current IP may be closed-loop controlled by an external controller in such a way that the air ratio $\lambda$ in the measuring gas exactly balances the oxygen flow through the diffusion channel 4, so that a constant value of $\lambda=1$ is present in the measuring chamber MK. A lambda value of 1 is always given when the voltage VS at the measuring cell NZ is 450 mV. The pump current IP resulting from this closed-loop control may be used as a sensor signal that is characteristic and significant for the oxygen content in the exhaust gas flow.

Such a broadband lambda probe is used, for example, to monitor the combustion process taking place in a burner of a gas boiler. The burner may then be controlled depending on the measuring values from the lambda probe. A error-free function of the lambda probe is important. If there is a defect in the sensor, the contacts or the driving of the sensor, the lambda probe may provide erroneous signals, which may lead to erroneous burner control. Then, the measured air ratio no longer corresponds to the actual air ratio in the exhaust gas flow and unwanted and potentially dangerous concentrations of carbon monoxide or unburned hydrocarbons may be emitted. If the air ratio in the exhaust gas flow is very high ($\lambda \gg 1$), the combustion efficiency may also be dramatically reduced.

Since such errors or defects may also be caused by aging processes in the lambda probe, it is necessary to reliably detect errors in the lambda probe as early as possible. The present invention is based on the object of providing a method with which an error in a lambda probe can be reliably detected in order to prevent the occurrence of a dangerous operating state of a gas burner.

According to a first aspect of the invention, the object is achieved by a method according to claim 1. According to a second aspect of the invention, the object is achieved by a gas burner according to claim 9. According to a third aspect of the invention, the object is achieved by a heating system according to claim 10. Further aspects of the invention are the subject matter of the dependent claims, the drawings and the following description of exemplary embodiments.

BRIEF DESCRIPTION OF THE DRAWINGS

Further advantageous developments are described in more detail below with reference to an exemplary embodiment illustrated in the drawings, to which the invention is not restricted, however, In the figures.

DETAILED DESCRIPTION OF THE INVENTION BASED ON EXEMPLARY EMBODIMENTS

In the following description of a preferred embodiment of the present invention, the same reference symbols designate the same or comparable components.

Figure 4:
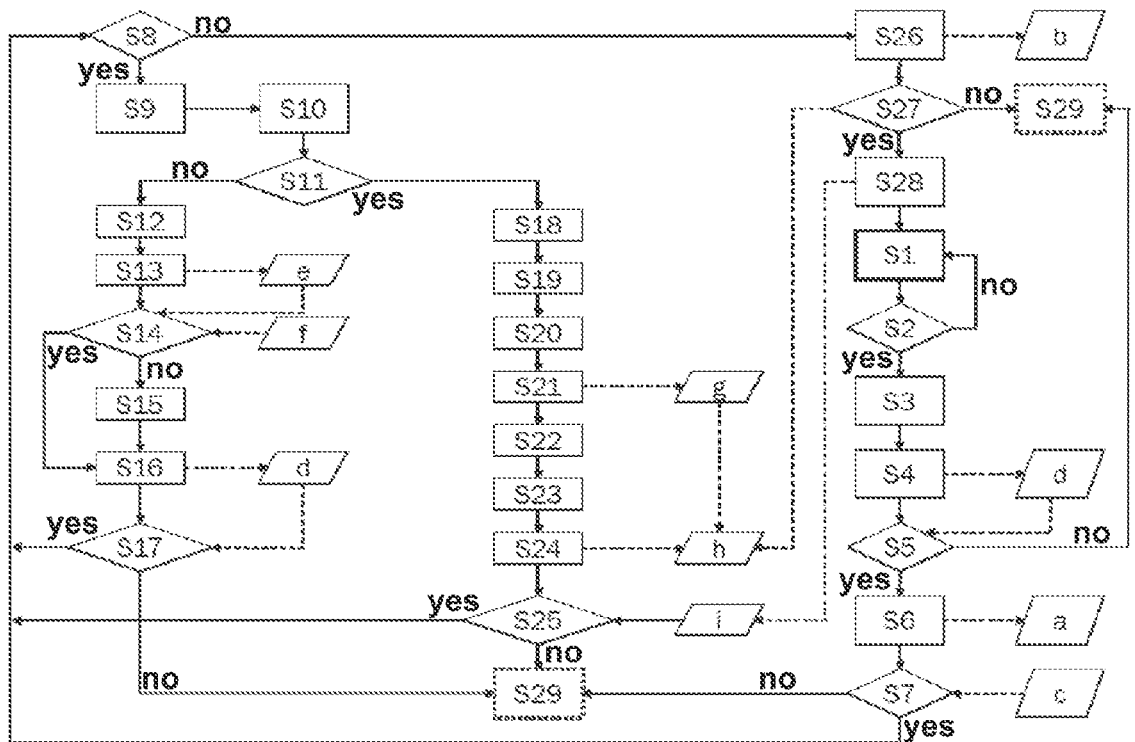
FIG. 4 shows an exemplary flow chart of a method for operating a gas burner.

FIG. 4 shows a flow chart of an exemplary method for operating a burner, for example a gas burner of a heating system, which includes a broadband lambda probe 1 for monitoring exhaust gas. The method steps are to denoted by numbers S1 to S29. Transitions between process steps are shown as solid arrows. Dashed arrows illustrate storing or reading of values measured and/or calculated in the method, which are denoted by the letters a to i.

The flow of the method can be divided into six function blocks as follows:

| | |
|---|---|
| F1 | Burner on standby (Step S1) |
| F2 | Burner start with probe calibration in air (steps S2 to S7) |
| F3 | Closed-loop controlled burner operation (steps S8 to S17) |
| F4 | Controlled burner operation during active probe test mode (steps S18 to S25) |
| F5 | Burner shutdown with probe calibration in air (steps S26-S28) |
| F6 | Safety shutdown in the event of an error (step S29) |

Figure 1:
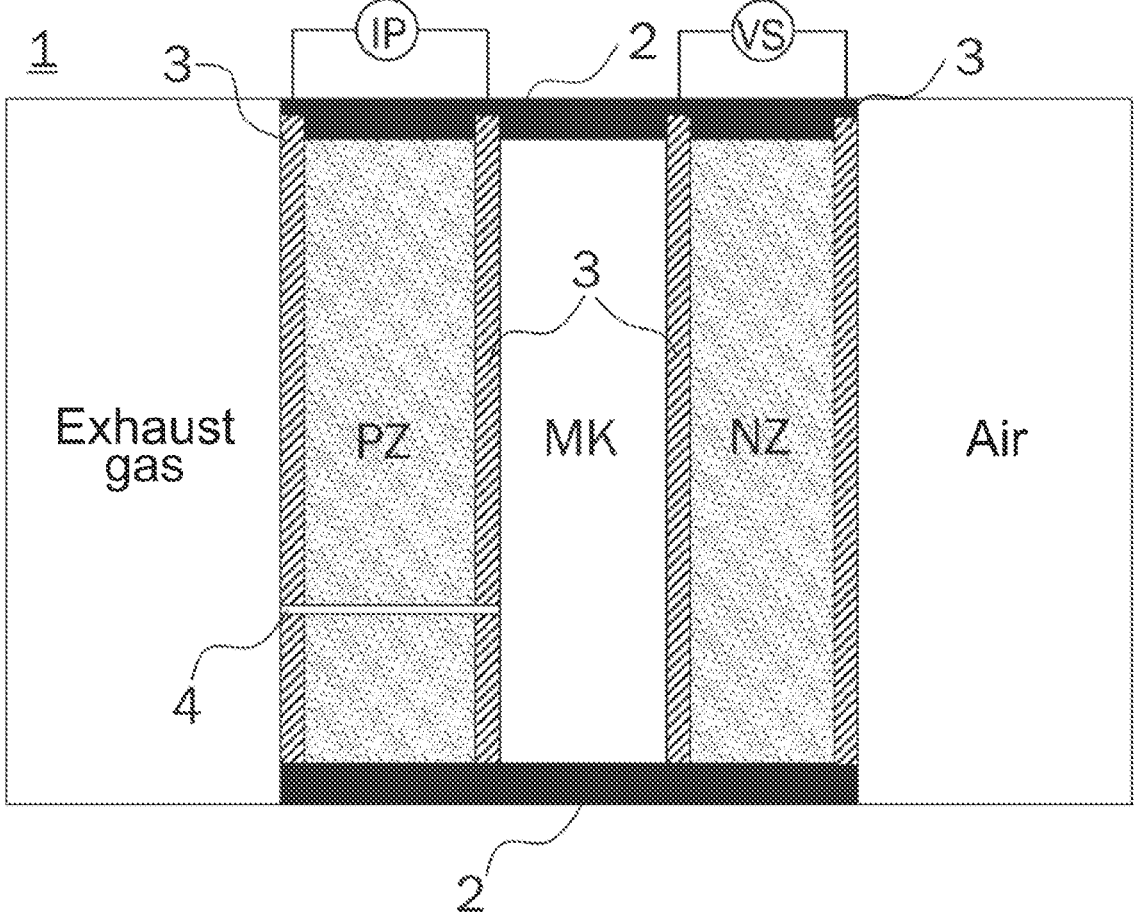
FIG. 1 shows a sectional view of an exemplary broadband lambda probe.
Figure 2:
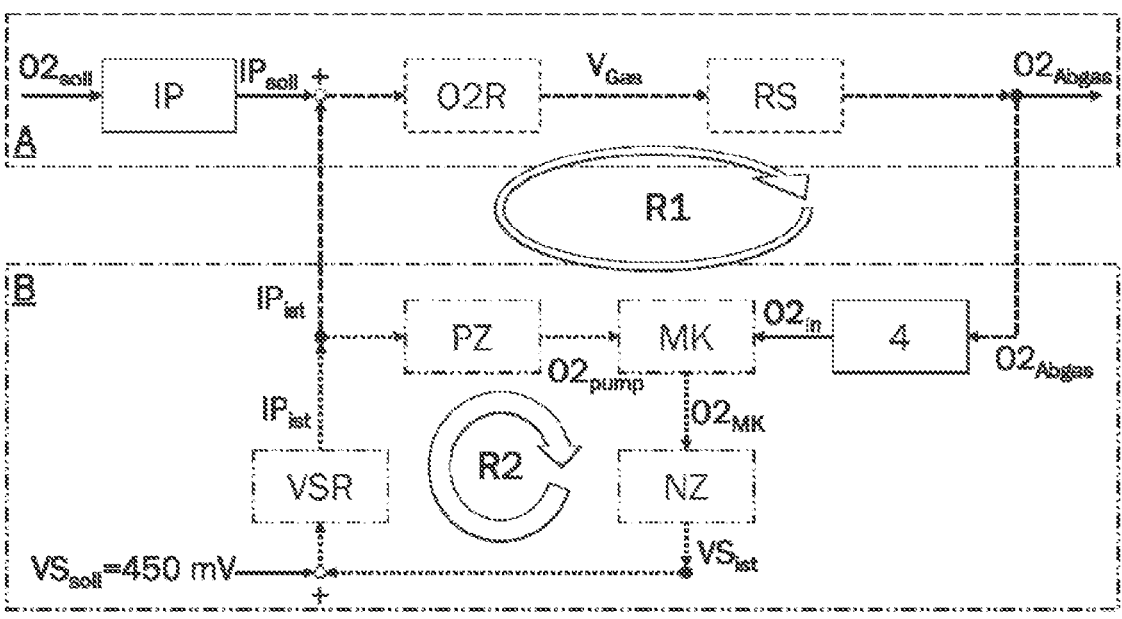
FIG. 2 illustrates an exemplary control scheme of a gas burner with a broadband lambda probe in controlled mode.
Figure 3:
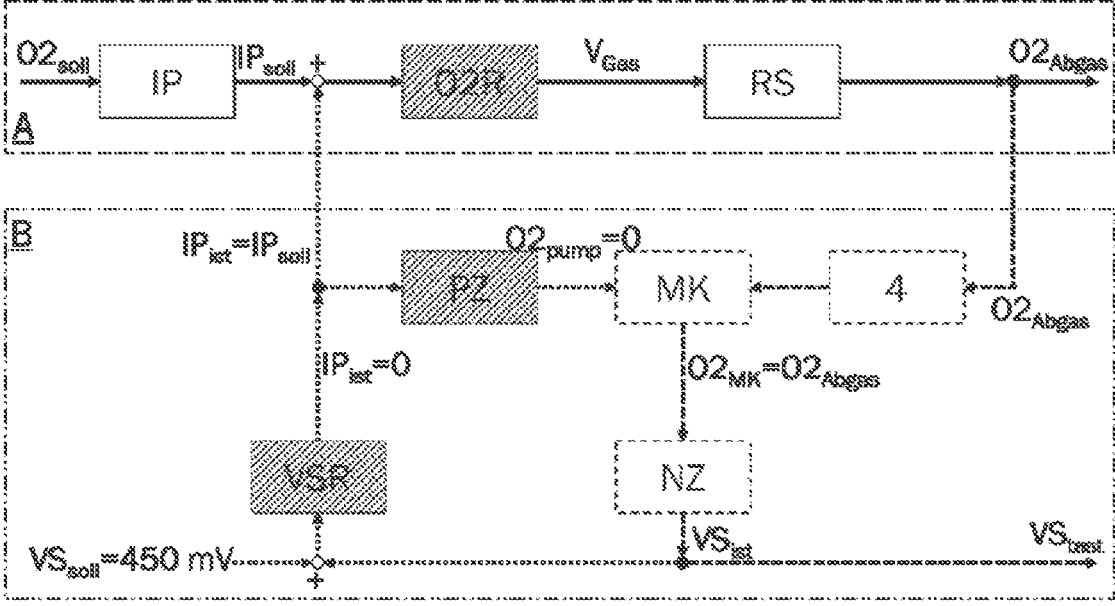
FIG. 3 illustrates an exemplary control scheme of a gas burner with a broadband lambda probe in the probe test mode.

First, an overview of the method, in particular of the function blocks F3 and F4, is given on the basis of the control schemes shown in FIGS. 2 and 3. A detailed description of the individual method steps S1 to S29 follows with reference to FIG. 4.

The function blocks F1, F2, F3, F5 and F6 are substantially similarly implemented in methods according to the prior art as well. The function block F4, i.e. the probe test mode, is the subject matter of the present invention. The exemplary method according to the invention described below may make it possible to use a commercially available, inexpensive, not intrinsically safe broadband lambda probe, as is also used in the automotive sector, in a safety environment such as a gas burner, without the use of additional sensors.

The measuring method of the broadband lambda probe 1 is based on operating two cells (measuring cell VZ and pump cell PZ) and a measuring chamber MK in a separate closed control loop, which is illustrated in FIG. 2.

FIG. 2 shows a control scheme of a gas burner with a broadband lambda probe in closed-loop controlled operation (first operating state). The block labeled A represents a higher-level control circuit R1 of a automatic firing unit of the gas burner. It controls the residual oxygen content in the exhaust gas $O2_{Abgas}$ and includes an O2 controller O2R, a controlled system RS and a function IP, which provides a target value $IP_{soll}$, which is calculated by means of a sensor characteristic $f(O2)$ from a target value $O2_{Soll}$ for the residual oxygen content in the exhaust gas. The target value of the residual oxygen content in the exhaust gas may be determined, for example, via a desired air ratio $\lambda$. A gas burner is usually operated with excess of air, i.e. with an air ratio $\lambda > 1$. From the desired air ratio $\lambda$, the target value $O2_{Soll}$ of the residual oxygen content in the exhaust gas may be determined as a volume concentration.

The first operating state (closed-loop controlled operation) of the gas burner includes in particular the steps of: measuring (step S12) a residual oxygen content (e) in the exhaust gas; comparing (step S14) the measured residual oxygen content (e) with a predetermined target value (f) and determining a deviation; controlling (step S15) an opening degree of the gas control valve as a function of a deviation; measuring the measuring voltage at the measuring cell NZ; comparing the measured measuring voltage with a predetermined target voltage and determining a deviation; and controlling the residual oxygen content in the exhaust gas via the measured value of the lambda probe 1. In particular, the pump current may be controlled as a function of the deviation. The individual steps are described in more detail below, A gas burner is usually operated with a substantially constant amount of air. Using a gas control valve, the automatic firing unit may control the volume flow of the supplied gas (fuel) via the O2 controller O2R as a function of the deviation between $IP_{soll}$ and $IP_{1st}$. With the amount of air being constant, the ratio of fuel (gas) to air may be controlled by means of the gas control valve.

The controlled system RS in FIG. 2 summarizes the transfer behavior of the burner from the gas control valve to the measurement of the residual oxygen content in the exhaust gas $O2_{Abgas}$. The controlled system RS may be influenced, inter ilia, by flame bodies, combustion and heat exchangers.

As illustrated in FIG. 2 (block B), the broadband lambda probe forms its own closed control loop R2 for oxygen measurement. Exhaust gas having the residual oxygen content $O2_{Abgas}$ enters the measuring chamber MR through the diffusion channel 4 and contributes to the oxygen content $O2_{MK}$ in the measuring chamber MK with an oxygen quantity $O2_{in}$. The cell voltage $VS_{ist}$ is measured by means of the measuring cell NZ. As a function of the pump current $IP_{ist}$, the oxygen quantity $O2_{pump}$ is pumped through the pump cell PZ into the measuring chamber MK or out of the measuring chamber MK. A controller VSR controls the measured cell voltage $VS_{ist}$ to be the target value $VS_{soll}$=450 mV. When the cell voltage $VS_{ist}$ is 450 mV, the measuring gas in the measuring chamber MK has the air ratio $\lambda$=1.

When an error occurs within the control circuit R2 of the oxygen measurement, which may be caused, for example, by the broadband lambda probe aging, crack formation in one of the cells or blockage of the diffusion channel 4, the automatic firing unit receives an incorrect measuring value $IP_{ist}$ and then adjusts to an incorrect residual oxygen content in the exhaust gas $O2_{Abgas}$. Within the control circuit R2 of the oxygen measurement, an equilibrium may be established again and again, so that no error can be detected on the basis of the measured variables typically present ($IP_{ist}$ and $VS_{ist}$). Both the pump current IP and the cell voltage VS are controlled variables that are always controlled towards the target value by the two controllers (VS controller VSR and O2 controller O2R).

In order to recognize probe errors and the associated deviation in the residual oxygen content of the exhaust gas $O2_{Abgas}$, the operating mode of the gas burner is changed cyclically according to the invention so that additional measuring values can be derived from the control circuit R2 of the oxygen measurement. The second state of operation is referred to as the probe test mode. The control scheme of the probe test mode is described with reference to FIG. 3.

In FIG. 3, the O2 controller O2R is deactivated. This may be achieved, for example, by virtually equating $IP_{ist}$ and $OP_{soll}$. This means that the residual oxygen content in the exhaust gas $O2_{Abgas}$ is kept constant. In other words, the degree of opening of the gas control valve remains unchanged and the burner is operated in open-loop controlled operation.

Moreover, the VS controller VSR is deactivated in the probe test mode by virtually equating $VS_{ist}$ and $VS_{soll}$. In addition, the pump cell PZ is deactivated (see step S18 in FIG. 4). This is achieved by switching off the voltage supply of the pump cell PZ so that no pump current flows. Consequently, with a pump current IP of 0 mA, the transport of oxygen molecules via the pump cell PZ into the measuring chamber MK (or out of the measuring chamber MK) is stopped ($O2_{pump}$=0). The inactive elements are shown hatched in FIG. 3.

These process steps result in the oxygen partial pressure in the measuring chamber MK matching the oxygen partial pressure in the exhaust gas ($O2_{MK}$=$O2_{Abgas}$) and the cell voltage $VS_{ist}$ drops significantly. Since the cell voltage $VS_{ist}$ is dependent on the oxygen partial pressure in the measuring chamber $O2_{MK}$ via a specific relationship with sufficient resolution, conclusions can be drawn about the residual oxygen content in the exhaust gas $O2_{Abgas}$.

After a defined dwell time (step S19), a process value $VS_{test\_akt}(g)$ is derived from the cell voltage $VS_{ist}$ by averaging (S2), said value being used for calculations in further process steps (S24 and S25) and then monitored for limits. A plausibility check is carried out thereby so that errors in the broadband sensor are detected when the process value is not within the specified limit values.

In particular, errors in the pump cell PZ and in the diffusion channel 4 can be detected with this method. However, the method requires an error-free measuring cell VZ. This is monitored separately and permanently by measuring the internal resistance $R_{IVS}$. The method required for this is specified by the manufacturer of the broadband lambda probe. When this value is within a tolerance range (S5), then the measuring cell VZ is error-free.

A possible drift in the cell voltage is also adapted to ensure that this method is absolutely error-free. This is done by comparing the pump current IP in air before and after each burner operation (probe calibration S6 and S26). When the deviation of both values is within a defined tolerance range, then $VS_{test\_akt}$ or $VS_{test}$ from the last burner operation is included proportionately in the target value $VS_{test\_soll}$ (S28), resulting in a new adapted target value for $VS_{test}$.

Method steps S1 to S29 are described in detail below with reference to FIG. 4.

In step S1, the burner is error-free and in standby mode.

In step S2, it is checked whether there is a burner request from a higher-level temperature controller. When there is a burner request (yes in S2), this is the start signal for burner operation. When there is no burner request (no in S2), the burner remains in standby mode.

In step S3, the broadband lambda probe 1 is activated. Activating the broadband lambda probe 1 is a standard method that is carried out according to the specifications of the manufacturer of the broadband lambda probe 1. Here, the broadband lambda probe 1 is first heated by means of the heating electrodes 2 and then the cell voltage is adjusted to 450 mV.

When the broadband lambda probe 1 is ready for operation, the cell resistance $R_{IVS}$ is measured in step S4. This measurement is also a standard method that is carried out according to the specifications of the manufacturer of the broadband lambda probe 1. For this, the measuring cell current $I_{CP}$ is switched on and off and the cell voltage VS is measured and the internal resistance of the cell (cell resistance) $R_{IVS}$ is calculated therefrom. The cell resistance $R_{IVS}$ is output as measuring value d and stored.

In step S5, the cell resistance Rivs measured in step S4 is compared with a limit value set at 400Ω, for example. When the cell resistance $R_{IVS}$ is less than the limit value (yes), then the method continues to step S6. A limit value violation (no), i.e. when a cell resistance Rivs is measured to be greater than the limit value, leads to a safety shutdown in step S29.

In step S6, a calibration of the lambda probe 1 is performed in air.

When the pump current IP is adjusted and constant, a first calibration factor $Kal21_1$ (measuring value a) is calculated using a calculation formula.

$$Kal21_1 = \frac{\sqrt{\left(4 \cdot A \cdot (21\% - C) + B^2\right)} - B}{2 \cdot A \cdot (Ip - \text{Offset})}$$

The variables A, B, C and Offset are coefficients of the sensor characteristic which are stored in an automatic firing unit.

In step S7, it is checked whether the calibration factor $Kal21_1$ (value a) calculated in step S6 is within a defined tolerance range, for example by comparing the deviation between the calibration factor $Kal21_1$ and a target value with a limit value $Kal21_{obs}$ (value c). When the calculated calibration factor Kal211 is not within the tolerance band (no in S7), a safety shut down of the burner is performed in step S29. When the calculated calibration factor $Ka21_1$ is within the tolerance band $Kal21_{obs}$ (yes in S7), the method continues to step S8, Calibration in air is required to compensate for manufacturing tolerances, aging effects of the sensor, and environmental influences such as atmospheric pressure. A deviation of the calibration factor $Kal21_1$ from the nominal value, defined as the tolerance band $Kal21_{obs}$, is interpreted as a sensor error, so that a safety shutdown (step S29) is carried out here.

In step S8 it is checked whether the burner request is still active. If the burner request is active (yes in S8), then the burner is operated in closed-loop controlled operation (continue to step S9). If the burner request is no longer active (no in S8), the method is continued in step S26 with a renewed probe calibration in air.

The closed-loop controlled normal operation (first operating state) of the burner corresponds to steps S8 to S17. First, the burner is ignited. The power modulation then starts in S9 according to the specification of the higher-level temperature controller.

In SW, the probe test mode is activated according to the parameterized cycle duration. The cycle duration results, for example, from the EN 12067 standard and is derived from the risk potential of an erroneous state of the system (gas burner) and its duration. For example, a typical cycle duration for a gas burner is 120 seconds.

In method step S11, it is queried whether the test mode of the lambda probe 1 is requested according to the cycle duration from the previous step S10. If this is not the case (no in step S11), the method continues to step S12 and the burner is continuedly operated in closed-loop controlled normal operation. If the query shows that the test mode is requested (yes in step S11), the burner changes to the active test mode and the method continues in step S18.

In step S12, the burner is operated in closed-loop controlled normal operation, with the regular probe control circuit R2 being active and supplying a measured pump current $IP_{ist}$, which is transmitted to the automatic firing unit. The actual value of the residual oxygen content (e) in the exhaust gas may be calculated from the measured pump current using a characteristic curve.

In step S13, the automatic firing unit calculates the actual value of the residual oxygen content $O2_{ist}$ (measuring value e) in the exhaust gas from the measured pump current $IP_{ist}$ and the sensor characteristic using the following formula:

$$O2_{ist} = A \cdot (IP - \text{Offset})^2 \cdot Kal21^2 + B(IP - \text{Offset}) \cdot Kal21 + C$$

The variables A, B, C and Offset are coefficients of the sensor characteristic, which are stored in the automatic firing unit.

In step S14, the O2 controller in the automatic firing unit compares the target value $O2_{soll}$ (value f) with the calculated actual value of the residual oxygen content $O2_{ist}$ (value e) from step S13 and determines a deviation. The target value $O2_{soll}$ is specified via the parameterization of the automatic firing unit. If the two values match (yes) or if the deviation is less than a predefined limit value, the method continues to step S16. If the values are not equal or if the deviation is greater than the specified limit value, the gas quantity $V_{Gas}$, in particular a degree of opening of a gas control valve as the manipulated variable, is readjusted as a function of the determined deviation in step S15. The gas quantity In step S16, the internal resistance of the measuring cell $R_{IVS}$ (value d) is continuously measured during normal operation of the burner. This measurement may be performed using the same method as in the measurement in step S4.

Similarly to step S5, the measured cell resistance $R_{IVS}$ (d) is compared with the limit value in step 17. If the limit value is adhered to (yes), the method returns to step 8. If the measured cell resistance Rvs is greater than the limit value (no), the safety shutdown takes place in step S29.

In step S18, the test mode of the O2 probe is active, with the regular operation (O2 controller) of the burner no longer being active. The burner is therefore no longer in a closed-loop controlled but in an open-loop controlled mode. This state may typically last about five seconds. The voltage supply of the pump cell is switched off in the probe control circuit.

In step S19, an O2 partial pressure equalization between the combustion chamber and the measuring chamber of the lambda probe 1 is carried out. This process may typically take less than a second. A longer time of two seconds may ensure that partial pressure equalization can also be carried out under disturbed conditions (e.g. blocked diffusion passage).

In step S20, the cell voltage Vs is measured. This is now typically 60 mV instead of 450 mV (depending on the residual oxygen content of the exhaust gas).

In step S21, the measured cell voltage $VS_{ist}$ is averaged over one second in order to compensate for any signal noise. The mean value of the cell voltage in test mode $VS_{test\_akt}$ (g) is stored as an intermediate result. This value is not used directly, but in a weighted manner (see step S24) for monitoring in order to make the process more robust against disturbing variables. If the residual oxygen content $O2_{ist}$ in the combustion chamber at the time of the probe test deviates slightly from the target value $O2_{soll}$ due to external conditions such as wind or gas pressure fluctuations, this should not affect the result of the probe test too much.

In step S22, the voltage supplies of the pump cell PZ and of the VS controller are activated again so that the pump current IP returns to the initial level and the cell voltage VS of 450 mV is thus adjusted.

It takes about one second to adjust the cell voltage to 450 mV. In step S23, there is a pause for an extended time of, for example, two seconds in order to ensure increased robustness since the control behavior may be slower for an aged lambda probe 1.

In step S24, the intermediate result from step S21 $VS_{test\_akt}$ (g) is incorporated into the test result $VS_{test}$ (h) via a sliding average with a weighting of, for example, 20%.

In step S25, the result from the probe test $VS_{test}$ (h) is compared with a dynamic limit value $VS_{test\_soll}$ (i). If the test result $VS_{test}$ is below the limit value (yes), the closed-loop controlled mode is continued in step S8. If the dynamic limit value $VS_{test\_soll}$ (i) is violated, an immediate safety shutdown follows in step S29.

When the burner request is canceled by the higher-level temperature controller, the method continues to step S26 after the test in step S8 (no). In step S26, first the flame is switched off and the gas burner or the lambda probe 1 is ventilated subsequently, During the subsequent ventilating, the lambda probe 1 is again calibrated in air. The result of the calibration is a second calibration factor $Kal21_2$(b).

In step S27, it is checked whether the second calibration factor $Kal21_2$ (b) after the burner run differs from the first calibration factor $Ral21_1$ (a) from the burner start-up (see step S6). If the deviation (that is, the difference between the values a and b) is greater than a permissible limit value (no in S27), a safety shutdown is carried out in step S29. If the deviation of the calibration factors a and b is too large, this indicates an error in the lambda probe 1 or the burner system (e.g. exhaust gas recirculation), so that safe operation can no longer he guaranteed.

When the difference between $Kal21_1$ (a) and $Kal21_2$ (h) is less than the defined limit value (yes in S27), an error-free lambda probe 1 is assumed, so that a new target value $VS_{test\_soll}$ (i) for the probe test can be determined in step S28. This is necessary because the cell voltage VS may drift over the lifetime. In particular, the robustness of the method can be increased in this way. The target value $VS_{test\_soll}$ (i) is corrected or included by 20% with the last result of the probe test $VS_{test}$ (h). The result is a weighted mean value that allows long-term correction of the target value so that short-term interference does not falsify the target value too much. The robustness of the method can thus be further increased. The new target value $VS_{test\_soll}$ is stored as value i and used in the next probe test (step S25).

The features disclosed in the above description, the claims and the drawings may be important both individually and in any combination for the implementation of the invention in its various embodiments.

LIST OF REFERENCE SYMBOLS $\lambda$ air ratio
IP pump current
VS cell voltage at the measuring cell
$VS_{ist}$ actual value of the cell voltage
$VS_{soll}$ target value of the cell voltage
$Kal21_1$ first calibration factor (a)
$Kal21_2$ second calibration factor (b)
$Kal21_{obs}$ tolerance band (c)
$R_{IVS}$ internal resistance of the measuring cell (d)
$O2_{ist}$ actual value of the residual oxygen content (e) in the exhaust gas
$O2_{soll}$ target value of the residual oxygen content (f) in the exhaust gas
$VS_{test\_akt}$ mean value of $VS_{ist}$ in test mode (g)
$VS_{test}$ probe test result (h)
$VS_{tst\_soll}$ target value for the probe test (i)
$O2_{pump}$ transport of oxygen molecules through the pump cell
$O2_{MK}$ oxygen partial pressure in the measuring chamber
$O2_{Abgas}$ oxygen partial pressure in the exhaust gas
O2R O2 controller
RS controlled system
VSR VS controller
1 broadband lambda probe
2 heater
3 electrode
4 diffusion channel
PZ pump cell
MK measuring chamber
NZ measuring cell (Nernst cell)

The invention claimed is:

1. A method for operating a gas burner which has a lambda probe arranged in the exhaust gas flow of said gas burner for measuring a residual oxygen content in the exhaust gas, wherein said gas burner is operated in a first operating state in closed-loop controlled operation, wherein the residual oxygen content in the exhaust gas is closed-loop controlled via the measured value of said lambda probe, characterized in that said gas burner carries out an error test of said lambda probe in a second operating state with the steps of:

determining a current test voltage (h) of a measuring cell (NZ) of said lambda probe when the current supply to a pump cell (PZ) of said lambda probe is switched off;

comparing the current test voltage (h) with a predetermined test target voltage (i) and determining a deviation; and when the deviation exceeds a predetermined limit:

performing a safety shutdown; or when the deviation does not exceed the predetermined limit:

operating said gas burner in the first operating state.

2. The method according to claim 1, wherein:

said lambda probe is a broadband lambda probe;

said gas burner further includes an automatic firing unit for closed-loop or open-loop controlling a quantity of gas supplied to said gas burner by means of a gas control valve; and said automatic firing unit sets the degree of opening of said gas control valve to a predetermined value in the second operating state.

3. The method according to claim 1, wherein said gas burner is cyclically switched from the first operating state to the second operating state after a predetermined time interval has lapsed.

4. The method according to claim 1, wherein determining the current test voltage (h) comprises:

measuring a measuring voltage at said measuring cell (NZ);

forming a mean value over time (g) of the measured measuring voltage over a specified period of time;

calculating the current test voltage (h) by forming a weighted mean value from the mean value over time of the measuring voltage (g) and a stored test voltage from a previous error test of said lambda probe; and storing the current test voltage (h).

5. The method according to claim 4, wherein the method in the second operating state, after forming the mean value over time (g) of the measured measuring voltage, further comprises:

switching on the current supply of said pump cell (PZ);

measuring the measuring voltage at said measuring cell (NZ);

comparing the measured measuring voltage with the predetermined target voltage and determining a deviation; and closed-loop controlling the residual oxygen content in the exhaust gas as a function of the deviation.

6. The method according to claim 1, wherein said gas burner carries out a probe calibration in air in a third operating state when there is no active burner request, said method comprising the steps of:

turning off the flame;

subsequently ventilating said lambda probe;

calculating a first calibration factor (b);

comparing the first calibration factor (b) with a stored second calibration factor (a) and determining a deviation; and when the deviation exceeds a predetermined limit value, performing the safety shutdown of said gas burner; or when the deviation does not exceed the predetermined limit value, calculating the test target voltage (i) by forming a weighted mean value from a stored test target voltage and the current test voltage (h) determined in the second operating state; and storing the test target voltage (i).

7. The method according to claim 1, further comprising:

measuring an internal resistance (d) of said measuring cell (NZ);

comparing the measured internal resistance (d) with a predetermined target value and determining a deviation; and when the deviation exceeds a predetermined limit value, performing a safety shutdown; or when the deviation does not exceed the predetermined limit value, operating said gas burner in the first operating state.

8. The method according to claim 1, further comprising:

carrying out a probe calibration in air and determining a second calibration factor (a);

storing the second calibration factor (a);

comparing the second calibration factor (a) with a predetermined target value (c) and determining a deviation; and when the deviation exceeds a predetermined limit value, performing a safety shutdown; or when the deviation does not exceed the predetermined limit value, operating said gas burner in the first operating state.

9. A gas burner for a heating system, the gas burner comprising:

a lambda probe arranged in the exhaust gas flow of said gas burner for measuring a residual oxygen content in the exhaust gas, wherein said gas burner is operated in a first operating state in closed-loop controlled operation, wherein the residual oxygen content in the exhaust gas is closed-loop controlled via the measured value of said lambda probe, characterized in that said gas burner is configured to carry out an error test of said lambda probe in a second operating state with the steps of:

determining a current test voltage (h) of a measuring cell (NZ) of said lambda probe when the current supply to a pump cell (PZ) of said lambda probe is switched off;

comparing the current test voltage (h) with a predetermined test target voltage (i) and determining a deviation; and when the deviation exceeds a predetermined limit:

performing a safety shutdown; or when the deviation does not exceed the predetermined limit:

operating said gas burner in the first operating state.

10. A heating system for a building, characterized in that said heating system comprises a gas burner which has a lambda probe arranged in the exhaust gas flow of said gas burner for measuring a residual oxygen content in the exhaust gas, wherein said gas burner is operated in a first operating state in closed-loop controlled operation, wherein the residual oxygen content in the exhaust gas is closed-loop controlled via the measured value of said lambda probe, characterized in that said gas burner is configured to carry out an error test of said lambda probe in a second operating state with the steps of:

determining a current test voltage (h) of a measuring cell (NZ) of said lambda probe when the current supply to a pump cell (PZ) of said lambda probe is switched off;

comparing the current test voltage (h) with a predetermined test target voltage (i) and determining a deviation; and when the deviation exceeds a predetermined limit:

performing a safety shutdown; or when the deviation does not exceed the predetermined limit:

operating said gas burner in the first operating state.

* * * * *